April 9, 1968     T. F. SHERMAN     3,377,104

ACCESSORY PICKUP TRUCK BED

Filed Sept. 12, 1966

INVENTOR.
THELDON F. SHERMAN
BY *Allen and Chromy*
ATTORNEYS 3,377,104
ACCESSORY PICKUP TRUCK BED
Theldon F. Sherman, 331 E. Court,
San Jose, Calif. 95116
Filed Sept. 12, 1966, Ser. No. 578,748
3 Claims. (Cl. 298—19)

ABSTRACT OF THE DISCLOSURE

An accessory dump bed which may be attached to existing pickup trucks. The rear end of the bed is pivotally attached to the pickup body and a hoisting mechanism comprising an upright member and winch is pivotally mounted on the floor at the forward end of the pickup body.

---

This invention relates to an accessory pickup truck bed constructed so the load may be easily dumped therefrom.

An object of this invention is to provide an improved accessory bed for pickup trucks which may be attached to the pickup truck by a pivoting member at the rear thereof and which is provided with an elevating mechanism at the front thereof so that the accessory bed may be raised and the load carried thereby dumped from the rear thereof.

Another object of this invention is to provide a detachable bed which may be positioned in the conventional pickup truck bed and from which the load may be dumped by raising the forward end thereof.

Still another object of this invention is to provide an auxiliary bed and raising mechanism which may be attached to the conventional bed of a pickup truck when it is desired to use the pickup truck as a small dump truck and which may be readily detached from the pickup truck when it is desired to use the pickup truck in the conventional manner.

Still another object of this invention is to provide an accessory pickup truck bed with pivoting means at the rear thereof for readily attaching and detaching the accessory bed to the rear of the conventional pickup truck bed, said accessory bed also being provided with a lifting winch at the front thereof attached to swivable pole member, the winch being operable from the side of the pickup truck by a crank connected thereto so that the front of the accessory bed may be raised by manually operating the winch and the load carried thereby may be dumped from the rear thereof.

Other and further objects of this invention will be apparent to those skilled in the art to which it relates from the following specification, claims and drawing in which briefly;

Figure 1:
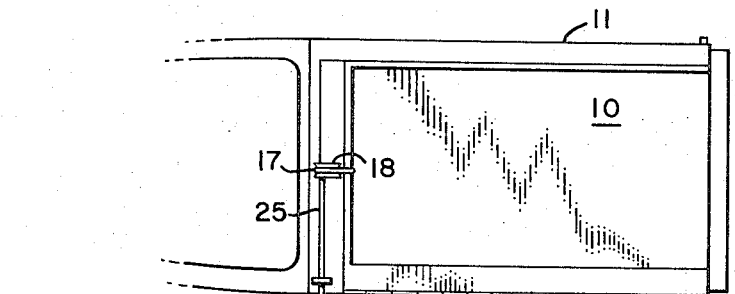
FIG. 1 is a plan view of an embodiment of this invention showing it positioned in the conventional bed of the pick-up truck which is shown partly cut away.
Figure 2:
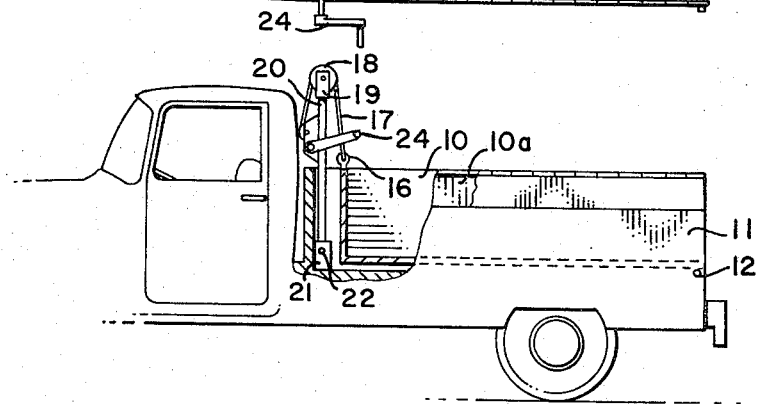
FIG. 2 is a side view partially in section of the accessory pickup truck bed shown in FIG. 1.

Referring to the drawing in detail, reference numeral 10 designates the accessory pickup truck bed which is made of a length slightly shorter than the conventional truck bed 11. The accessory bed 10 is made of a width slightly less than that of the conventional bed 11 so that the accessory bed fits into the truck bed conveniently. The accessory bed 10 may be made deeper than the conventional bed 11 so that the sides of the bed 10 extend over the bed 11 and thereby provide an increased carrying capacity.

Figure 3:
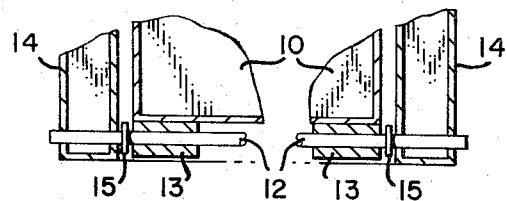
FIG. 3 is a detail view partially in section of the pivoting mechanism provided for attaching the rear of the accessory bed to the pickup truck bed.
Figure 4:
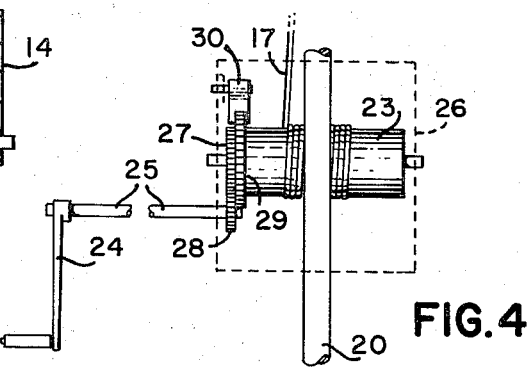
FIG. 4 is a detail view of the winch employed in accordance with this invention.

The rear end of the accessory bed 10 is pivotally attached to the conventional bed 11 by the rod 12 shown in FIG. 3. The rod 12 is positioned in the tubular members 13 which may be attached to the accessory bed 10 by welding or the like if this accessory bed is made of metal. On the oher hand, if the accessory bed 10 is made of wood, plastic or the like, tubular members 13 may also be made of wood, plastic or the like cemented or otherwise attached to the rear edge of the accessory bed.

The end portions of the rod 12 are positioned in suitable holes formed in the pickup truck frame memebr 14 and suitable cotter pins 15 are positioned in holes formed in the rod 12 adjacent to the inside of the frame members 14 to prevent the rod 12 from sliding out of these frame members during use. The rod 12 may of course be removed from the frame memebrs 14 and from the tubular members 13 after the cotter pins 15 are removed so that the accessory bed may be pulled or lifted out of the pickup truck bed.

Figure 6:
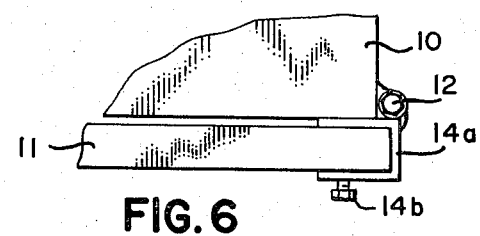
FIG. 6 is a detail view showing a modified form of device for pivotally attaching the accessory bed to the truck frame.

On the other hand the end portions of the rod 12 may be attached by welding or the like to suitable clamps 14a such as shown in FIG. 6 and these clamps may be attached to the rear ends of the pickup truck frame members 14 by volts 14b which are threaded into the clamps. Each end of the rod 12 may be provided with one of these clamps and the necessity of boring holes through the frame 14 may be eliminated. At the same time the rod 12 may be quickly detached from the truck frame when it is desired to remove the accessory bed.

The front of the accessory bed 10 is provided with an eye bolt 16 to which the lifting cable 17 is attached. This cable passes over the pulley 18 that is rotatably supported in the U-shaped member 19 which is attached to the top of the post 20. The bottom of the post 20 is attached to the U-shaped member 21 by the pivot pin 22 so that this post may tilt slightly when the accessory bed is lifted by the cable.

Figure 5:
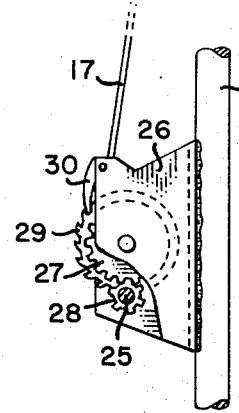
FIG. 5 is a detail view showing the arrangement used for mounting the winch on the supporting post.

The cable 17 is adapted to be wound around the drum of the winch 23 when this winch is rotated by the manually operated crank 24 which is attached thereto by the rod 25. The crank 24 may be positioned on the side of the truck bed and it may be detachable from the rod 25 if desired. The winch 23 is supported on the post 20 by the plate member 26 which is welded to the post as shown in FIG. 5. The plate 26 is shaped so that it provides bearing support for both ends of the winch 23 which is provided with a shaft extending through bearing holes bored through the plate. The winch 23 may be rotated directly by the rod 25 which may be connected to the shaft of the winch or it may be provided with a gear which is fixedly connected to the shaft of the winch and which meshes with a smaller pinion gear 28 that is fixedly connected to the shaft 25.

The upright member 20 must of course be high enough to lift the front of the accessary bed for dumping the load therefrom. Also this member 20 must be rigid enough so that it is able to support the load placed in the forward part of the accessory bed during lifting of this load by the cable and winch. As the load is lifted by winding the cable on the winch the post or upright member 20 gradually increases its angle of inclination back toward the front wall of the accessory bed without actually coming in contact therewith. The size of this angle also depends upon the distance between the bottom pivot of the upright member and the front of the accessory bed. This spacing should be proportioned so that the post 20 is practically vertical when the accessory bed is down, that is, at the start of the lifting thereof by the cable.

One side of the winch 23 is provided with a tooth wheel 29, the teeth of which are oriented so as to be gripped by the pawl 30 which is pivotally attached to the upper part of the plate 26. The pawl 30 engages the tooth wheel 29 to prevent unwinding of the cable from the winch when the forward end of the accessory bed 10 is being elevated, that is when the cable 17 is being wound on the winch 23 by counterclockwise rotation of the latter. When it is desired to lower the front end of the accessory bed 10 the pawl 30 is released by moving the winch forward a fraction of a tooth by gripping the manual crank 24 and the pawl is then raised over its support. The front end of the accessory bed 10 may then be lowered by gravity as the cable 17 is allowed to unwind from the winch 23 by manually controlling the crank 24.

Sufficient space is provided between the back of the driver's cab of the truck and the front wall of the accessory bed so that the upright member or post 20 may be positioned in this space. If desired the eye bolt 16 may be attached to the bottom part of the front wall of the accessory bed instead of the top as shown.

The bottom end of the post 20 is pivotally attached to the pickup truck bed by the pin 22 which is positioned in a hole at the lower end of the post and which is also positioned in holes through U-shaped member 21. The U-shaped member 21 may be attached to the pickup truck bed by suitable bolts and the pin 22 may be removable therefrom when it is desired to remove the post 20 and winch mechanism together with the accessory bed 10 from the pickup truck bed. The bottom of the post 20 is pivotally attached to the pickup truck bed so that this post supporting the pulley 18 at the top thereof may tilt rearwardly slightly as the accessory bed 10 is being raised. Furthermore, if desired the truck bed may be provided with a suitable socket for receiving the bottom end of the post 20 and holding the bottom end of the post against lateral shifting when the front of the accessory bed is being elevated.

Suitable storage space is provided by the chambers 10a formed at the sides of the accessory bed 10 shown in FIG. 1. These chambers will accommodate the post 20 and winch mechanism when these are not in use, as well as other tools. Suitable doors are hinged to the accessory bed to provide closure means to these chambers.

While I have shown a preferred embodiment of the invention, it will be apparent that the invention is capable of modification and variation from the form shown so that its scope should be limited only by the scope of the claims appended hereto.

What I claim is:

1. In an accessory truck bed adapted to be removably attached to the top of an existing truck bed comprising a vertical end wall, the combination of an accessory bed having a bottom, a front wall attached to the front end of said bottom and side walls attached to the sides of said bottom, said bottom being adapted to rest on the top of the conventional truck bed with the front thereof being positioned adjacent to the back of the driver's cab of the truck, a rigid upright member positioned between the front of said accessory bed and the back of said driver's cab, pivot means attached to the truck bed for pivoting the bottom end of said upright member on the bed of said truck so that said upright member is adapted to incline toward the front of said accessory bed, a pulley, means rotatably attaching said pulley to the top of said upright member, a cable supported by said pulley, a winch positioned on the forward side of said upright member and above the front wall and said truck bed end wall, one end of said cable being attached to said winch, means attaching the other end of said cable to the front part of said accessory bed, means pivotally attaching the rear part of said accessory bed to the rear part of said truck bed and manually operated means for rotating said winch and winding said cable on said winch for lifting the front part of said accessory bed and dumping material loaded on said accessory bed out of the rear thereof.

2. In an accessory truck bed adapted to be removably attached to the top of an existing truck bed, the combination as set forth in claim 1, further characterized in that said means pivoting said upright member to said truck bed is spaced forward of said accessory bed a distance such that said upright member is substantially vertical at the start of lifting of the front of said accessory bed by said cable.

3. In an accessory truck bed adapted to be removably attached to the top of an existing truck bed, the combination as set forth in claim 2, further characterized in that said upright member pivoting means and said means pivotally attaching the rear of said accessory bed are detachable so that said accessory bed and said upright member may be readily removed from said truck bed.

References Cited

UNITED STATES PATENTS

| | | | |
|---|---|---|---|
| 1,277,907 | 9/1918 | Gillespie | 298—19 |
| 2,033,209 | 3/1936 | Teetor | 298—19 |
| 2,573,478 | 10/1951 | McKendrey | 298—19 |
| 3,055,709 | 9/1962 | Kirkwood | 298—14 X |
| 3,237,989 | 3/1966 | Fulton | 298—19 |

RICHARD J. JOHNSON, *Primary Examiner.*